United States Patent Office 2,987,546
Patented June 6, 1961

2,987,546
ACYL- AND AMINO-SUBSTITUTED PHENOL ETHERS

Erich Muller, Biberach (Riss), Germany, assignor to Dr. Karl Thomae G.m.b.H., Biberach (Riss), Germany, a corporation of Germany
No Drawing. Filed July 10, 1959, Ser. No. 826,111
Claims priority, application Germany July 12, 1958
9 Claims. (Cl. 260—562)

This invention relates to acyl- and amino-substituted phenol ethers, and more particularly to compounds having the general structural formula

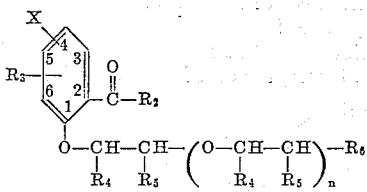

(I)

wherein X is an amino radical of the formula

in which R is hydrogen, lower alkyl, hydroxy-substituted lower alkyl, lower alkoxy-lower alkyl or lower alkenyl and $R_1$ is hydrogen, lower alkyl, hydroxy-substituted lower alkyl, lower alkoxy-lower alkyl, lower alkenyl, lower alkanoyl or hydroxy-substituted lower alkanoyl, attached to the benzene ring in the 4- or 5-position,
$R_2$ is alkyl with 1 to 11 carbon atoms or an unsubstituted or substituted aryl radical,
$R_3$ is hydrogen, halogen, lower alkyl, lower alkenyl or lower alkoxy,
$R_4$ is hydrogen or lower alkyl,
$R_5$ is hydrogen, halogen or lower alkyl,
$R_6$ is halogen, hydroxyl, lower alkoxy, lower alkanoyloxy or halogen-substituted methyl, and
$n$ is a whole number from 0 to 2, inclusive.

The compounds embraced by Formula I above may be prepared by methods customarily employed for the preparation of acyl- and amino-substituted ethers. The following methods have been found to be particularly suitable:

*Method A.*—Condensation of acyl- and amino-substituted phenols of the general formula

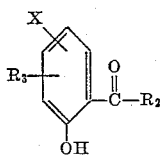

(II)

or their alkali metal salts, wherein X, $R_2$ and $R_3$ have the meanings defined above in connection with Formula I, with compounds of the general formula

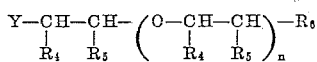

(III)

wherein Y is halogen or an aromatic sulfonyl radical and $R_4$, $R_5$, $R_6$ and $n$ have the meanings defined above in connection with Formula I, in the absence of solvents or in aqueous suspension or in the presence of solvents, such as alcohols, aliphatic or aromatic hydrocarbons or aromatic nitro-compounds, in the absence or presence of acid-binding agents, such as alkali metal amides, alkali metal alcoholates, alkali metal hydroxides, alkali metal carbonates, akali metal bicarbonates, alkaline earth metal hydroxides and alkaline earth metal carbonates, advantageously at temperatures between 40 and 150° C., preferably at the boiling point of the solvent if one is used.

When compounds of the Formula III are used in which Y is chlorine or bromine, the addition of a catalytic amount (1/100 to 1/10 equivalent) of potassium iodide is recommended to accelerate the reaction.

It is also advantageous to perform the condensation reaction in an inert atmosphere, for example in an atmosphere of nitrogen, in order to eliminate the oxidizing effect of oxygen from the air.

It has been found to be particularly advantageous to perform the condensation reaction in a water-immiscible alcohol, such as butanol, and in the presence of sodium carbonate or potassium carbonate. The advantages derived therefrom are that, because of the good solvent characteristics of butanol, the volume of the reaction mixture can be kept small, the water formed by the reaction can be continuously removed by means of a water separator, and the progress of the reaction can thus be continuously checked. The carbonates have a very low resinizing effect because they are relatively weak alkalies. Moreover, the use of nitrogen as an inert atmosphere is necessary only at the beginning of the reaction under these conditions, because a sufficient amount of carbon dioxide is formed by the reaction to provide the necessary inert atmosphere.

*Method B.*—For the preparation of compounds having the general Formula I wherein $R_6$ is hydroxyl:

Addition reaction between acyl-amino-substituted phenols of the Formula II above with alkylene oxides of the general formula

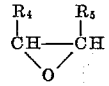

(IV)

wherein $R_4$ and $R_5$ have the meanings defined above in connection with Formula I in the presence of 1/100 to 1/10 mol of an alkali metal salt of the particular acyl-amino-substituted phenol and, if desired, in the presence of solvents, especially in the presence of those glycols having the structural formula

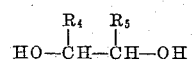

(V)

from which the alkyleneoxide reactant is derived, at temperatures of 100 to 200° C., preferably at 120 to 140° C.

The following addition reaction conditions have been found to be particularly advantageous: If the alkyleneoxide is introduced dropwise in the liquid state into the reaction vessel, the use of a good reflux cooler which can be cooled with a cooling brine at a temperature below 0° C., if possible, is recommended. The low-molecular-weight alkyleneoxide evaporates to a great extent when a drop hits the hot liquid reaction mixture; the addition reaction therefore takes place to a substantial degree from the gaseous phase, and it is therefore recommended to agitate the reaction mixture so turbulently that the gas is entrained into the reaction liquid in finely divided form. The reaction proceeds satisfactorily under these conditions.

The reaction may also be performed in an autoclave, by adding the alkyleneoxide to an alkaline solution of the acyl-amino-substituted phenol in liquid or gaseous form under pressure, and then raising the reaction mixture to the desired reaction temperature, accompanied by stirring or shaking.

*Method C.*—For the preparation of compounds having the general Formula I wherein $R_6$ has the indicated meanings except halogen, hydroxyl or halogen-substituted methyl:

Condensation of acyl-amino-substituted phenol ethers of the general formula

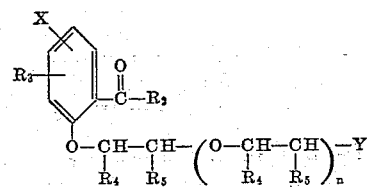

(VI)

wherein Y is halogen or an aromatic sulfonyl radical and X, $R_2$, $R_3$, $R_4$, $R_5$ and $n$ have the meaning previously defined in connection with Formula I, with compounds of the general formula $$Me-O-R_6 \quad (VII)$$

wherein Me is an alkali metal and $R_6$ has the meanings defined in connection with Formula I, except halogen, hydroxyl or halogen-substituted methyl. The condensation reaction is most advantageously performed in the presence of inert organic solvents at temperatures of 50 to 200° C., and preferably at the boiling point of the solvent. Suitable solvents are, for example, methanol, ethanol, propanol, dioxan, tetrahydrofuran and dimethylformamide.

The compounds of the Formula VI which are used as starting materials in this method are prepared in accordance with method A by etherification of the corresponding acyl-amino-substituted phenols.

*Method D.*—For the preparation of compounds of the Formula I, wherein $R_5$ is halogen, $R_6$ is halogen-substituted methyl, and $n$ is 0, while the remaining substituents have the defined meaning in connection with Formula I:

Addition of halogen to compounds of the general formula

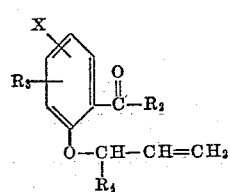
(VIII)

wherein X, $R_2$, $R_3$ and $R_4$ have the meanings defined above in connection with Formula I. The addition reaction is advantageously carried out in solvents, such as alcohol, chloroform, glacial acetic acid or dimethylformamide, preferably at low temperatures from −20 to +20° C.

The compounds of the Formula VIII which are used as starting materials in this method are prepared by etherification of the corresponding acyl-amino-substituted phenols with corresponding allyl compounds in accordance with known procedures.

*Method E.*—For the preparation of the indicated general Formula I, wherein R and $R_1$ are hydrogen:

Reduction of nitro-compounds of the general formula

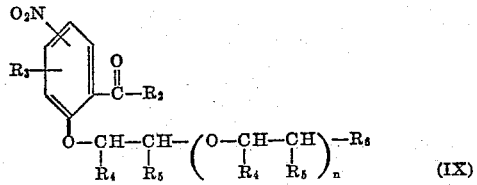
(IX)

wherein $R_2$, $R_3$, $R_4$, $R_5$, $R_6$ and $n$ have the meanings defined above in connection with Formula I. The reaction is carried out by known methods, for example by reduction with shavings or powder of iron, zinc, tin, aluminum, or magnesium in acid aqueous or alcoholic-aqueous suspension; by reduction with salts of dithionous acid or of hydrosulfuric acid in alcoholic solution; or by catalytic reduction, for example with hydrogen and Raney nickel, in inert solvents such as alcohol, tetrahydrofuran or dioxan.

The acyl-nitro-substituted phenol ethers of the Formula IX which are used as starting materials in this method are prepared by etherification of the corresponding acyl-nitro-substituted phenols with compounds of the general formula

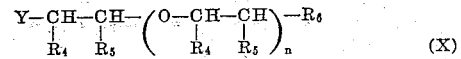
(X)

wherein $R_4$, $R_5$, $R_6$ and $n$ have the meanings defined above in connection with Formula I and Y is halogen or an aromatic sulfonyl radical in accordance with known methods.

*Method F.*—For the preparation of compounds having the indicated general Formula I, wherein R and $R_1$ have the meanings defined in connection with Formula I, except hydrogen:

Introduction of radicals R and/or $R_1$ into the amino substituent of compounds of the general formula

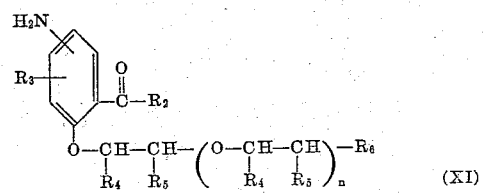
(XI)

wherein $R_2$, $R_3$, $R_4$, $R_5$, $R_6$ and $n$ have the meanings previously defined in connection with Formula I. Compounds XI may be prepared by method E above, for example.

The introduction of radicals R and/or $R_1$ into the amino substituent may be carried out in accordance with known methods, such as by reaction of Compounds XI with corresponding halides, sulfates, or sulfonates in the presence of condensation agents, such as alkali metal hydroxides, alkali metal carbonates, alkali metal amides or alkali metal alcoholates, in aqueous suspension or in inert organic solvents, such as alcohols or hydrocarbons. Mono- or di-substitution of the amino radical may be achieved thereby. Hydroxyalkyl substitution may also be effected with the aid of an alkyleneoxide under the conditions set forth in method B above.

If $R_1$ means a lower alkanoyl or a lower hydroxy-substituted alkanoyl radical, its introduction may be carried out by known methods, for example by reaction of Compounds XI or by reaction of Compounds I, wherein $R_1$ is hydrogen, with chlorides, anhydrides or simple esters of lower alkyl carboxylic acids or lower hydroxyalkyl carboxylic acids.

*Method G.*—In those cases where methods A through F yield compounds of the Formula I wherein $R_6$ is a hydroxyl radical, they may, if desired, be further reacted as described below, whereby compounds of the Formula I, wherein $R_6$ is a lower alkanoyloxy radical, are obtained:

Condensation of compounds having the general structural formula

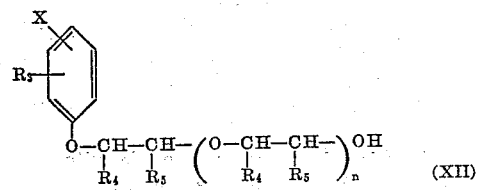
(XII)

wherein X, $R_2$, $R_3$, $R_4$, $R_5$ and $n$ have the meanings defined above in connection with Formula I, with halides, simple esters or anhydrides of lower alkyl carboxylic acids in the presence or absence of solvents and, if desired, in the presence of a condensation agent, such as an alkali metal hydroxide, alkali metal carbonate, alkali metal amide, alkali metal alcoholate or alkali metal salt of the acid to be introduced, preferably at temperatures from 0 to 200° C.

If R and $R_1$ are hydrogen or lower alkyl, alkenyl hydroxyalkyl or alkoxyalkyl the compounds having structural Formula I may be prepared in the form of their acid addition salts with inorganic acids, such as hydrochloric acid, sulfuric acid or phosphoric acid, or with organic acids, such as acetic acid, lactic acid, citric acid and the like, by well known procedures.

The compounds embraced by Formula I exhibit excellent antipyretic, antiphlogistic and analgesic properties; for example, they are superior in regard to these properties to phenacetin (p-ethoxy-acetanilide). A considerable advantage of the compounds according to the invention resides in that they cause less of a methemoglobin formation in the organism than phenacetin. The pharmacological effect of the novel ethers disclosed herein also exceeds that of the acylamino-substituted phenols disclosed in the prior art.

The following examples will further illustrate the present invention without limiting it.

EXAMPLE 1

*Preparation of 2-acetyl-4-acetaminophenyl-β-methoxy-ethyl ether by method A*

193 gm. (1.0 mol) 2-acetyl-4-acetamino-phenol, 138 gm. (1.0 mol) potassium carbonate and 1500 cc. n-butanol were placed into a 3-neck round-bottom flask provided with a stirring device, a water-separator, a reflux cooler, a gas feed-line and a dropping funnel. The mixture was then heated to the boiling point and boiled until an amount of water corresponding approximately to the initial moisture content of the mixture had separated in the water-separator. Thereafter 230 gm. (0.1 mol) p-toluene-sulfonic acid-β-methoxy-ethyl ester were added to the mixture over a period of ½ hour, and the resulting reaction mixture was refluxed for four additional hours, whereby the water formed by the reaction separated out in the water-separator. The butanol was then distilled off in vacuo and the hot liquid residue was poured into ice-cold water, accompanied by stirring. The water contained a small amount of sodium hydroxide to dissolve out any unreacted 2-acetyl-4-acetamino-phenol which may be present in the reaction mixture. The mixture was then filtered on a vacuum filter and the filter cake was washed with water and recrystallized from 50% aqueous methanol. The reaction product, having the structural formula

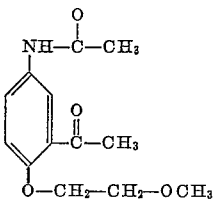

and a melting point of 114° C., was obtained in the form of long, colorless needles.

EXAMPLE 2

*Preparation of 2-acetyl-4-acetaminophenyl-β-hydroxy-propyl ether by method B*

50 gm. 1,2-propylene-glycol, 38.6 gm. (0.2 mol) 2-acetyl-4-acetamino-phenol and 1 cc. of a 40% aqueous sodium hydroxide solution (0.01 mol) were placed into a 3-neck, round-bottom flask provided with a stirring device, reflux cooler and dropping funnel, and the mixture was heated to 125° C. Thereafter, while turbulently stirring the mixture, 12.75 gm. (0.22 mol) propylene oxide were added dropwise at a rate such that a gentle reflux was continuously maintained. The completed etherification reaction was indicated by the fact that toward the end of the reaction the excess of propyleneoxide was no longer absorbed as rapidly as at the beginning of the reaction and the reflux ceased. The reaction mixture was then diluted with water to 3 times its volume, made alkaline with sodium hydroxide to dissolve out any unreacted 2-acetyl-4-acetamino-phenol and filtered on a vacuum filter. The filter cake was washed with water and recrystallized from water. The reaction product, having the structural formula

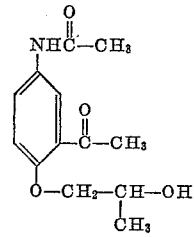

and a melting point of 153 to 154° C., was obtained in the form of long, white needles.

EXAMPLE 3

*Preparation of 2-propionyl-4-acetaminophenyl-β-acetoxy-ethyl ether by method C*

13.0 gm. 2-propionyl-4-acetaminophenyl-β-chloroethyl ether (produced from 2-propionyl-4-acetamino-phenol and p-toluene-sulfonic acid-β-chloroethyl ester in the presence of an alkali) were dissolved in 50 cc. dimethylformamide, and after adding 13 gm. potassium acetate to the solution the resulting mixture was heated under reflux for 5 hours. Thereafter, 2 liters of ice water were poured into the reaction mixture. A crystalline substance separated out after a short period of time which was filtered off on a vacuum filter. The filter cake, consisting of 15 gm. of the raw moist reaction product, was recrystallized from a 50% aqueous methanol solution, yielding 7.0 gm. (49.5% of theory) 2-propionyl-4-acetaminophenyl-β-acetoxy-ethyl ether having the structural formula

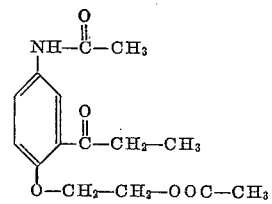

and a melting point of 101 to 103° C. in the form of white crystals.

EXAMPLE 4

*Preparation of 2-acetyl-4-acetamino-phenyl-β,γ-dibromo-propyl ether by method D*

5.0 gm. 2-acetyl-4-acetaminophenyl-allyl ether (produced from 2-acetyl-4-acetamino-phenol and allyl chloride in the presence of an alkali) were dissolved in 250 cc. glacial acetic acid, and the resulting solution was cooled to 15° C., accompanied by stirring. 34.4 gm. bromine were then added dropwise and very slowly to the cooled solution, and after the reaction had gone to completion the reaction mixture was poured into ice water. The reaction product, which separated out at first as an oily substance, crystallized after a few minutes and was then separated on a vacuum filter. The filter cake was recrystallized twice from isopropanol, yielding 42.0 gm. of a compound having the structural formula

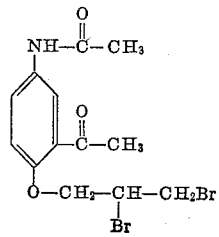

EXAMPLE 5

*Preparation of 2-acetyl-4-acetaminophenyl-β-methoxy-ethyl ether by methods E and F*

17.0 gm. (0.0712 mol) 2-acetyl-4-nitrophenyl-β-methoxy-ethyl ether (prepared from 2-acetyl-4-nitro-phenol and p-toluene-sulfonic acid-β-methoxy-ethyl ester) were dissolved in 100 cc. dioxan, and the resulting solution was hydrogenated in the presence of 3 gm. Raney nickel under a pressure of 720 mm. Hg and at a temperature of 17° C. 5410 cc. hydrogen were consumed (calculated quantity: 5480 cc.). The dioxan was then distilled off and the residue was recrystallized from gasoline. The hydrogenation product had the structural formula

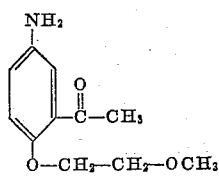

5 gm. of this 4-amino-phenol ether were boiled for 15 minutes with 10 cc. acetic acid anhydride and the mixture was then stirred into water. The substance precipitated thereby was separated on a vacuum filter and filter cake was recrystallized from a 50% aqueous solution of methanol. The reaction product, having the structural formula

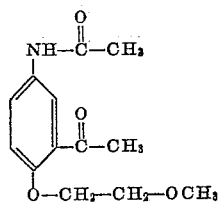

and a melting point of 113 to 114° C., was obtained in the form of long, colorless needles.

EXAMPLE 6

*Preparation of 2-butyryl-4-N-methyl-N-acetylamino-phenyl-β-methoxy-ethyl ether by method F*

23.7 gm. (0.1 mol) 2-butyryl-4-aminophenyl-β-methoxy-ethyl ether and 13 gm. potassium carbonate were stirred into 50 cc. dimethylformamide and then 14.0 gm. methyliodide (0.1 mol) were added dropwise to the solution. The reaction proceeded with evolution of heat and formation of carbon dioxide. After all of the methyliodide had been added, the reaction mixture was heated for 1 hour at 60° C., whereupon it was cooled. The raw reaction product was then precipitated by adding water to the reaction mixture. The precipitate was separated on the vacuum filter and the filter cake was subjected to preliminary purification by dissolving it in 2 N hydrochloric acid and reprecipitating it from solution with concentrated ammonia. After again separating the precipitate on a vacuum filter, the filter cake was recrystallized from gasoline, yielding 2-butyryl-4-methylaminophenyl-β-methoxy-ethyl ether, having the structural formula

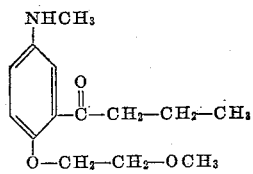

and a melting point of 72 to 74° C., in the form of golden yellow, brilliant leaflets.

5.0 gm. of this compound were then boiled with 5 cc. acetic acid anhydride for 10 minutes and the resulting solution was poured into water while it was still hot. The oily substance precipitated thereby soon crystallized throughout and was then recrystallized from aqueous methanol. The reaction product, having the structural formula

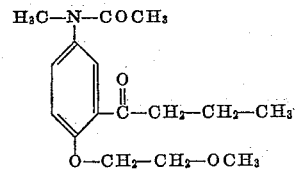

and a melting point of 95 to 96° C., was obtained in the form of brilliant silver leaflets.

EXAMPLE 7

*Preparation of 2-acetyl-4-acetaminophenyl-β-acetoxy-ethyl ether by method G*

23.7 gm. (0.1 mol) 2-acetyl-4-acetaminophenyl-β-hydroxy-ethyl ether (prepared from 2-acetyl-4-acetamino-phenol and ethylene oxide in accordance with the procedure described in Example 2), 20.4 gm. (0.2 mol) acetic acid anhydride and 8.3 gm. (0.1 mol) sodium acetate were heated at the boiling point for 1 hour, the mixture was poured into hot water and the solution was allowed to cool. The precipitate formed thereby was separated on a vacuum filter and the filter cake was recrystallized from isopropanol, yielding the reaction product having the structural formula

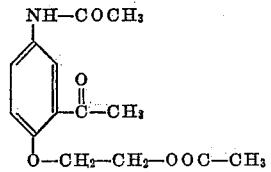

and a melting point of 136 to 137° C. in the form of white crystals.

EXAMPLE 8

*Preparation of 2-acetyl-5-acetaminophenyl-β-methoxy-ethyl ether by method A*

A mixture of 60 gm. (0.278 mol) of the sodium salt of 2-acetyl-5-acetamino-phenol, 300 cc. 4-butanol and 80 gm. (0.278 mol) p-toluene-sulfonic acid-β-methoxy-ethyl ester was boiled for 3 hours, accompanied by stirring. The reaction mixture was allowed to cool to room temperature and was then admixed with water and shaken. The butanol layer was separated and dried with potassium carbonate. The butanol was distilled off and the residue was recrystallized from xylene. The purified reaction product, having the structural formula

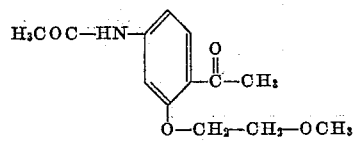

and a melting point of 128 to 130° C., was obtained in the form of white crystals.

The following table lists additional compounds of the Formula I above which were prepared. In each case the table defines the substituent radicals X, $R_2$ through $R_6$ and the integer $n$, and gives the reactants used, the melting point of the reaction product and the procedure used in preparing the particular compound.

| Ex. No. | Reactants | X | $R_2$ | $R_3$ | $R_4$ | $R_5$ | $R_6$ | $n$ | M.P., °C | Prepared by process analogous to Ex. No.— |
|---|---|---|---|---|---|---|---|---|---|---|
| 9 | 2-acetyl-4-acetamino-phenol and p-toluene-sulfonic acid-β-ethoxy-ethyl ester. | 4-NHCOCH₃ | —CH₃ | —H | —H | —H | —OC₂H₅ | 0 | 125 | 1 |
| 10 | 2-acetyl-4-acetamino-phenol and ethylene-oxide. | 4-NHCOCH₃ | —CH₃ | —H | —H | —H | —OH | 0 | 164–165 | 2 |
| 11 | 2-acetyl-4-acetamino-phenol and p-toluene-sulfonic acid-β-chloroethyl ester. | 4-NHCOCH₃ | —CH₃ | —H | —H | —H | —Cl | 0 | 165–166 | 1 |
| 12 | 2-acetyl-4-acetamino-phenol and p-toluene-sulfonic acid-γ-chloropropyl ester. | 4-NHCOCH₃ | —CH₃ | —H | —H | —H | —CH₂Cl | 0 | 132–133 | 1 |
| 13 | 2-propionyl-4-acetamino-phenol and propyleneoxide. | 4-NHCOCH₃ | —CH₂—CH₃ | —H | —H | —CH₃ | —OH | 0 | 141.5–143 | 2 |
| 14 | 2-propionyl-4-acetamino-phenol and p-toluene-sulfonic acid-β-methoxy-ethyl ester. | 4-NHCOCH₃ | —CH₂—CH₃ | —H | —H | —H | —OCH₃ | 0 | 91–92 | 1 |
| 15 | 2-propionyl-4-acetamino-phenol and p-toluene-sulfonic acid-β-ethoxy-ethyl ester. | 4-NHCOCH₃ | —CH₂—CH₃ | —H | —H | —H | —OC₂H₅ | 0 | 80–82 | 1 |
| 16 | 2-propionyl-4-acetamino-phenol and p-toluene-sulfonic acid-β-propoxy-ethylester. | 4-NHCOCH₃ | —CH₂—CH₃ | —H | —H | —H | —OC₃H₇ | 0 | 84–85 | 1 |
| 17 | 2-propionyl-4-acetamino-phenol and p-toluene-sulfonic acid-β-butoxy-ethylester. | 4-NHCOCH₃ | —CH₂—CH₃ | —H | —H | —H | —OC₄H₉ | 0 | 78–83 | 1 |
| 18 | 2-propionyl-4-acetamino-phenol and p-toluene-sulfonic acid-β-chloro-ethyl. | 4-NHCOCH₃ | —CH₂—CH₃ | —H | —H | —H | —Cl | 0 | 133 | 1 |
| 19 | 2-propionyl-4-acetamino-phenol and p-toluene-sulfonic acid-γ-chloro-propyl ester. | 4-NHCOCH₃ | —CH₂—CH₃ | —H | —H | —H | —CH₂Cl | 0 | 109–110 | 1 |
| 20 | 2-propionyl-4-acetamino-phenol and p-toluene-sulfonic acid-β-(methoxy-ethoxy)-ethyl ester. | 4-NHCOCH₃ | —CH₂—CH₃ | —H | —H | —H | —OCH₃ | 1 | 83–84 | 1 |
| 21 | 2-propionyl-4-acetamino-phenyl and p-toluene-sulfonic acid-β-(ethoxy-ethoxy)-ethyl ester. | 4-NHCOCH₃ | —CH₂—CH₃ | —H | —H | —H | —OC₂H₅ | 1 | 66–68 | 1 |
| 22 | 2-butyryl-4-acetamino-phenol and ethylene-oxide. | 4-NHCOCH₃ | —CH₂—CH₂—CH₃ | —H | —H | —H | —OH | 0 | 121–122 | 2 |
| 23 | 2-butyryl-4-acetamino-phenol and propylene oxide. | 4-NHCOCH₃ | —CH₂—CH₂—CH₃ | —H | —H | —CH₃ | —OH | 0 | 87–89 | 2 |
| 24 | 2-butyryl-4-acetamino-phenol and p-toluene-sulfonic acid-β-ethoxy-ethyl ester. | 4-NHCOCH₃ | —CH₂—CH₂—CH₃ | —H | —H | —H | —OCH₃ | 0 | 93–95 | 1 |
| 25 | ....do.... | 4-NHCOCH₃ | —CH₂—CH₂—CH₃ | —H | —H | —H | —OC₂H₅ | 0 | 92–93 | 1 |
| 26 | 2-butyryl-4-acetamino-phenol and p-toluene-sulfonic acid-β-chloro-ethyl ester. | 4-NHCOCH₃ | —CH₂—CH₂—CH₃ | —H | —H | —H | —Cl | 0 | 109–111 | 1 |
| 27 | 2-butyryl-4-acetamino-phenol and p-toluene-sulfonic acid-γ-chloro-propyl ester. | 4-NHCOCH₃ | —CH₂—CH₂—CH₃ | —H | —H | —H | —CH₂Cl | 0 | 104–106 | 1 |
| 28 | 2-isobutyryl-4-acetamino-phenol and p-toluene-sulfonic acid-β-methoxy-ethyl ester. | 4-NHCOCH₃ | —CH(CH₃)₂ | —H | —H | —H | —OCH₃ | 0 | 100–101 | 1 |
| 29 | 2-isobutyryl-4-acetamino-phenol, and p-toluene-sulfonic acid-β-ethoxy-ethyl ester. | 4-NHCOCH₃ | —CH(CH₃)₂ | —H | —H | —H | —OC₂H₅ | 0 | 98–99 | 1 |
| 30 | 2-isobutyryl-4-acetamino-phenol and p-toluene-sulfonic acid-β-chloro-ethyl ester. | 4-NHCOCH₃ | —CH(CH₃)₂ | —H | —H | —H | —Cl | 0 | 100–102 | 1 |
| 31 | 2-isobutyryl-4-acetamino-phenol and p-toluene-sulfonic acid γ-propyl ester. | 4-NHCOCH₃ | —CH(CH₃)₂ | —H | —H | —H | —CH₂Cl | 0 | 97–99 | 1 |
| 32 | 2-acetyl-4-acetamino-phenyl allyl ether and chlorine. | 4-NHCOCH₃ | —CH₃ | —H | —H | —Cl | —CH₂Cl | 0 | 113–115 | 4 |
| 33 | 2-propionyl-4-acetamino-phenyl-β-hydroxy-propylether and acetic acid anhydride. | 4-NHCOCH₃ | —CH₂—CH₃ | —H | —H | —CH₃ | —OOCCH₃ | 0 | 137–139 | 7 |
| 34 | 2-propionyl-4-acetamino-phenyl-β-hydroxy-ethyl ether and acetic acid anhydride. | 4-NHCOCH₃ | —CH₂—CH₃ | —H | —H | —H | —OOCCH₃ | 0 | 103–105 | 7 |
| 35 | 2-propionyl-4-acetamino-phenol and ethyleneoxide. | 4-NHCOCH₃ | —CH₂—CH₃ | —H | —H | —H | —OH | 0 | 118–120 | 2 |
| 36 | 2-butyryl-4-nitro-phenyl-β-methoxy-ethyl ether and hydrogen. | 4-NH₂ | —CH₂—CH₂—CH₃ | —H | —H | —H | —OCH₃ | 0 | 63–65 | 5 |
| 37 | 2-butyryl-4-aminophenyl-β-methoxy-ethyl ether and methyl iodide. | 4-N(CH₃)₂ | —CH₂—CH₂—CH₃ | —H | —H | —H | —OCH₃ | 0 | 160–164 | 6 |
| 38 | 2-isobutyryl-4-acetamino-phenol and propyleneoxide. | 4-NHCOCH₃ | —CH(CH₃)₂ | —H | —H | —CH₃ | —OH | 0 | 101–102 | 2 |
| 39 | 2-isobutyryl-4-acetamino-phenol and ethyleneoxide. | 4-NHCOCH₃ | —CH—(CH₃)₂ | —H | —H | —H | —OH | 0 | 92–94 | 2 |
| 40 | 2-propionyl-4-acetamino-phenol and β,β′-dichloro diethyl ether. | 4-NHCOCH₃ | —CH₂—CH₃ | —H | —H | —H | —Cl | 1 | 72–74 | 1 |
| 41 | 2-propionyl-4-acetamino-phenol and p-toluene-sulfonic acid-β-(butoxy-ethoxy)-ethyl ester. | 4-NHCOCH₃ | —CH₂—CH₃ | —H | —H | —H | —OC₄H₉ | 1 | 62–64 | 1 |
| 42 | 2-propionyl-4-acetamino-phenyl-allyl ether and bromine. | 4-NHCOCH₃ | —CH₂—CH₃ | —H | —H | —Br | —CH₂Br | 0 | 109–112 | 4 |
| 43 | 2-benzoyl-4-acetamino-phenol and p-toluene-sulfonic acid-β-methoxy-ethyl ester. | 4-NHCOCH₃ | —C₆H₅ | —H | —H | —H | —OCH₃ | 0 | 54–55 | 1 |
| 44 | 2-butyryl-4-amino-phenyl-β-methoxy-ethyl ester and γ-hydroxy-butyric acid anhydride. | 4-NHCO(CH₂)₃—OH | —CH₂—CH₂—CH₃ | —H | —H | —H | —OCH₃ | 0 | 68–70 | 6 |

| Ex. No. | Reactants | X | $R_2$ | $R_3$ | $R_4$ | $R_5$ | $R_6$ | $n$ | M.P., °C. | Prepared by process analogous to Ex. No.— |
|---|---|---|---|---|---|---|---|---|---|---|
| 45 | 2-butyryl-4-amino-phenyl-β-methoxy-ethyl ether and ethyleneoxide. | 4-N(CH₂—CH₂OH)₂ | —CH₂—CH₂—CH₃ | —H | —H | —H | —OCH₃ | 0 | 75 | 6 |
| 46 | 2-butyryl-4-amino-phenyl-β-methoxy-ethyl ether and propylene oxide. | 4-NH(CH₂—CH—OH)<br>\|<br>CH₃ | —CH₂—CH₂—CH₃ | —H | —H | —H | —OCH₃ | 0 | 60–62 | 6 |
| 47 | 2-butyryl-4-amino-phenyl-β-methoxy-ethyl ether and benzene-sulfonic acid-β-methoxy-ethylester. | 4-N(CH₂—CH₂—OCH₃)₂ | —CH₂—CH₂—CH₃ | —H | —H | —H | —OCH₃ | 0 | 35–37 | 6 |
| 48 | 2-butyryl-4-amino-phenyl-β-methoxy-ethyl ether and allyl chloride. | 4-NH(CH₂—CH=CH₂) | —CH₂—CH₂—CH₃ | —H | —H | —H | —OCH₃ | 0 | 64–66 | 6 |
| 49 | 2-pelargonyl-4-acetamino-phenol and benzene sulfonic acid-β-methoxy-ethylester. | 4-NHCOCH₃ | —(CH₂)₇—CH₃ | —H | —H | —H | —OCH₃ | 0 | 88 | 1 |
| 50 | 2-acetyl-4-acetamino-6-bromo-phenol and p-toluene-sulfonic acid-β-methoxy-ethyl-ester. | 4-NHCOCH₃ | —CH₃ | 6-Br | —H | —H | —OCH₃ | 0 | 94–96 | 1 |
| 51 | 2-propionyl-4-acetamino-phenol and p-toluene-sulfonic acid-β-[β'-(β''-n-butoxy)-ethoxy]-ethyl ester. | 4-NHCOCH₃ | —CH₂—CH₃ | —H | —H | —H | —OC₄H₉ | 2 | (¹) | 1 |
| 52 | 2-acetyl-4-nitro-5-methoxy-phenol and hydrogen. | 4-NH₂ | —CH₃ | 5—OCH₃ | —H | —H | —OCH₃ | 0 | 114–116 | 5 |
| 53 | 2-acetyl-4-amino-5-methoxy-phenyl-β-methoxy-ethyl ether and acetic acid anhydride. | 4-NHCOCH₃ | —CH₃ | 5—OCH₃ | —H | —H | —OCH₃ | 0 | 175–176 | 6 |
| 54 | 2-acetyl-5-acetamino-sodium phenolate and p-toluene-sulfonic acid-β-ethoxy-ethyl ester. | 5-NHCOCH₃ | —CH₃ | —H | —H | —H | —OC₂H₅ | 0 | 96–98 | 8 |
| 55 | 2-acetyl-5-acetamino-sodium phenolate and p-toluene-sulfonic acid-β-chloro-ethyl ester. | 5-NHCOCH₃ | —CH₃ | —H | —H | —H | —Cl | 0 | 144–146 | 8 |
| 56 | 2-acetyl-5-acetamino-sodium phenolate and p-toluene-sulfonic acid-γ-chloro-propyl ester. | 5-NHCOCH₃ | —CH₃ | —H | —H | —H | —CH₂Cl | 0 | 126–127 | 8 |
| 57 | 2-propionyl-5-propion-amino-sodium phenolate and p-toluene-sulfonic acid-β-methoxy-ethyl ester. | 5-NHCOCH₂CH₃ | —CH₂—CH₃ | —H | —H | —H | —OCH₃ | 0 | 87–88 | 8 |
| 58 | 2-propionyl-5-propion-amino-sodium phenolate and p-toluene-sulfonic acid-β-ethoxy-ethyl ester. | 5-NHCOCH₂CH₃ | —CH₂—CH₃ | —H | —H | —H | —OC₂H₅ | 0 | 82–83 | 8 |
| 59 | 2-propionyl-5-acetamino-sodium phenolate and p-toluene-sulfonic acid-β-chloro-ethyl ester. | 5-NHCOCH₃ | —CH₂—CH₃ | —H | —H | —H | —Cl | 0 | 127–130 | 8 |
| 60 | 2-propionyl-5-acetamino-sodium phenolate and p-toluene-sulfonic acid-γ-chloropropyl ester. | 5-NHCOCH₃ | —CH₂—CH₃ | —H | —H | —H | —CH₂Cl | 0 | 101–103 | 8 |
| 61 | 2-butyryl-5-acetamino-sodium phenolate and p-toluene-sulfonic acid-β-methoxy ethyl ester. | 5-NHCOCH₃ | CH₂—CH₂—CH₃ | —H | —H | —H | —OCH₃ | 0 | 106 | 8 |
| 62 | 2-acetyl-5-acetamino-phenol and ethylene-oxide. | 5-NHCOCH₃ | —CH₃ | —H | —H | —H | —OH | 0 | 148 | 2 |
| 63 | 2-acetyl-5-acetamino-phenol and p-toluene-sulfonic acid-β-methoxy-ethyl ester. | 5-NHCOCH₃ | —CH₃ | 4-Br | —H | —H | —OCH₃ | 0 | 121–123 | 1 |

¹ B.p. at 0.5 mm. Hg: 272° C.

While I have illustrated the present invention with the aid of certain specific embodiments thereof, it will be readily apparent to those skilled in the art that the invention is not limited to these embodiments and that various changes and modifications may be made without departing from the spirit of the invention or the scope of the appended claims.

I claim:

1. Compounds having the structural formula

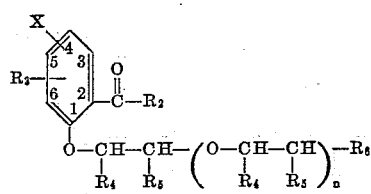

wherein X is selected from the group consisting of 4-amino and 5-amino radicals of the formula

in which R is selected from the group consisting of hydrogen, lower alkyl, hydroxy-substituted lower alkyl, lower alkoxy-lower alkyl, and lower alkenyl, and $R_1$ is selected from the group consisting of hydrogen, lower alkyl, hydroxy-substituted lower alkyl, lower alkoxy-lower alkyl, lower alkenyl, lower alkanoyl and hydroxy-substituted lower alkanoyl, $R_2$ is selected from the group consisting of alkyl with 1 to 11 carbon atoms and phenyl, $R_3$ is selected from the group consisting of hydrogen, halogen and lower alkoxy, $R_4$ is hydrogen, $R_5$ is selected from the group consisting of hydrogen, halogen and lower alkyl, $R_6$ is selected from the group consisting of halogen, hydroxyl, lower alkoxy, lower alkanoyloxy, and halogen-substituted methyl, and $n$ is a whole number from 0 to 2, inclusive.

2. 2-propionyl-4-acetylaminophenyl-$\beta$-methoxy-ethyl ether.

3. 2-propionyl-4-acetylaminophenyl-$\beta$-chloro-ethyl ether.

4. 2-propionyl-4-acetylaminophenyl-$\beta$-($\beta'$-ethoxy)-ethoxy-ethyl ether.

5. 2-butyryl-4-acetylaminophenyl-$\beta$-methoxy-ethyl ether.

6. 2-butyryl-4-dimethylaminophenyl-$\beta$-methoxy-ethyl ether.

7. 2-propionyl-5-propionylaminophenyl-$\beta$-methoxy-ethyl ether.

8. 2-propionyl-5-acetylaminophenyl-$\gamma$-chloro-propyl ether.

9. 2-butyryl-4-($\beta$-hydroxy-propyl)-aminophenyl-$\beta$-methoxy-ethyl ether.

References Cited in the file of this patent

UNITED STATES PATENTS 2,921,961   Mueller et al. _____ Jan. 19, 1960

FOREIGN PATENTS 670,584   Germany _____ Jan. 20, 1939

OTHER REFERENCES

Kunckell: "Chemische Berichte," vol. 34, pages 124–128 (1901).

Mathieson et al.: "Journal of the Chemical Society," part II, pages 1133–1137 (1949).

Julia: "Societe Chemique de France," Bulletin T. 19, pages 639–642 (1952).